(12) United States Patent
Kurimura et al.

(10) Patent No.: US 7,105,147 B2
(45) Date of Patent: Sep. 12, 2006

(54) METHOD FOR PARTIAL OXIDATION OF METHANE USING DENSE, OXYGEN SELECTIVE PERMEATION CERAMIC MEMBRANE

(75) Inventors: Hideki Kurimura, Tokyo (JP); Shoichi Kaganoi, Tokyo (JP); Yohei Suzuki, Tokyo (JP)

(73) Assignee: Teïkokuoil Co., Ltd., Tokyo (JP)

( * ) Notice: Subject to any disclaimer, the term of this patent is extended or adjusted under 35 U.S.C. 154(b) by 222 days.

(21) Appl. No.: 10/363,699

(22) PCT Filed: Sep. 17, 2001

(86) PCT No.: PCT/JP01/08036

§ 371 (c)(1),
(2), (4) Date: Dec. 17, 2003

(87) PCT Pub. No.: WO02/24571

PCT Pub. Date: Mar. 28, 2002

(65) Prior Publication Data

US 2004/0101472 A1    May 27, 2004

(30) Foreign Application Priority Data

Sep. 20, 2000 (JP) ............................. 2000-284647

(51) Int. Cl.
*C01B 3/24* (2006.01)
*C01B 3/26* (2006.01)

(52) U.S. Cl. .................. 423/648.1; 423/650; 423/651; 423/418.2; 252/373

(58) Field of Classification Search ............ 423/648.1, 423/650, 651, 418.2; 252/373
See application file for complete search history.

(56) References Cited

U.S. PATENT DOCUMENTS 5,306,411 A    4/1994    Mazanec et al. ............ 204/265

(Continued)

FOREIGN PATENT DOCUMENTS

EP         0 882 670      12/1998

(Continued)

OTHER PUBLICATIONS

Hayakawa et al., "Sustainable Ni/Ca$_{1-x}$Sr$_x$TiO$_3$ Catalyst Prepared In Situ For The Partial Oxidation Of Methane To Synthesis Gas", Applied Catalysis A: General, 149 (1997) 391-410.

(Continued)

*Primary Examiner*—Stanley S. Silverman
*Assistant Examiner*—Timothy C. Vanoy
(74) *Attorney, Agent, or Firm*—Jacobson Holman PLLC

(57) ABSTRACT

Methane in a feedstock gas having methane as its main component, is partially oxidized with oxygen, which selectively permeates from a first side to a second side of a oxygen selective permeation ceramic membrane. Air is contacted with the first side of the oxygen selective permeation ceramic membrane, and the feedstock gas containing methane is contacted with the second side of the oxygen selective permeation ceramic membrane. A first catalyst for partial oxidation of methane is disposed two-dimensionally on the second side of the oxygen selective permeation ceramic membrane, and a second catalyst for partial oxidation of methane is disposed three-dimensionally in the feedstock gas stream downstream from the first catalyst. Furthermore, steam is mixed into the feedstock gas stream at a ratio of 0.25 to 0.5 moles of steam based on the moles of carbon in the feedstock gas.

6 Claims, 2 Drawing Sheets

U.S. PATENT DOCUMENTS

| | | | |
|---|---|---|---|
| 5,725,218 A | 3/1998 | Maiya et al. | 277/1 |
| 5,980,840 A * | 11/1999 | Kleefisch et al. | 422/211 |
| 6,010,614 A | 1/2000 | Keskar et al. | 205/765 |
| 6,033,632 A | 3/2000 | Schwartz et al. | 422/190 |
| 6,458,334 B1 * | 10/2002 | Tamhankar et al. | 423/418.2 |
| 6,689,294 B1 * | 2/2004 | Seier Christensen et al. | 252/373 |
| 2002/0013227 A1 * | 1/2002 | Dindi et al. | 502/325 |

FOREIGN PATENT DOCUMENTS

| | | |
|---|---|---|
| EP | 0 926 097 | 6/1999 |
| EP | 0 962 422 | 12/1999 |
| EP | 0 962 423 | 12/1999 |
| JP | 06-135703 | 5/1994 |
| JP | 11-070314 | 3/1999 |
| JP | 2000-000469 | 1/2000 |
| WO | 98/41394 | 9/1998 |
| WO | 98/48921 | 11/1998 |
| WO | 99/21640 | 5/1999 |
| WO | 99/21649 | 5/1999 |

OTHER PUBLICATIONS

Hayakawa et al., "Partial Oxidation Of Methane To Synthesis Gas Over Some Titanates Based Perovskite Oxides", Catalysis Letters, 22 (1993) 307-317, Dec.

Takehira et al., "Partial Oxidation Of Methane To Synthesis Gas Over (Ca,Sr) (Ti,Ni) Oxides" Catalysis Today, 24 (1995) 237-242.

* cited by examiner

METHOD FOR PARTIAL OXIDATION OF METHANE USING DENSE, OXYGEN SELECTIVE PERMEATION CERAMIC MEMBRANE

This is a nationalization of PCT/JP01/08036 filed Sep. 17, 2001 and published in Japanese.

TECHNICAL FIELD

The present invention relates to a reaction technology using an oxygen selective permeation ceramic membrane reactor for producing synthesis gas, which is a mixture of hydrogen and carbon monoxide, that can be used as a feedstock for producing clean liquid fuel such as Fischer-Tropsch synthesis oil, methanol and dimethyl ether, using a gas which includes methane as the feedstock, and the above technology is characterized by minimizing the quantity of catalyst to be used, suppressing the deterioration of the catalyst and significantly improving the reaction efficiency. The present invention also relates to a technology for reducing the size of the membrane reactor and a related facility while maximizing the oxygen permeability through the oxygen selective permeation ceramic membrane and significantly increasing the yield of synthesis gas production.

BACKGROUND ART

Producing a clean synthetic liquid fuel from a gas including methane as a feedstock contributes to the effective utilization of untapped natural gas and other resources and to the supply of an environmentally-friendly clean energy source. Actually, however, technologies for producing synthesis liquid fuel have hardly been commercialized anywhere in the world at present, except for methanol that is used as the feedstock for the chemical industry. This is because the technology is not economically viable for commercial application based on the current level of technology and the prices of existing fuels, indicating that further improvement of the technology is indispensable for reducing the cost. This technology consists of two phases; the production of a synthesis gas from a gas that contains methane, and the production of a liquid fuel from the synthesis gas. Reduction of cost in the former phase that accounts for about 60% of the total equipment investment has a greater impact. With the background of concerns over shortage of natural resources and the global environment, there have been growing social demand for practical application of this technology, thus prompting the development of technologies that reduce the cost and improve the energy efficiency in the stage of producing the synthesis gas.

At present a steam reforming process is principally employed in the production of synthesis gas used as the feedstock for producing methanol or other purposes. In addition to the fact that steam reforming is an endothermic reaction that requires the supply of heat from the outside, an excessive quantity of steam is supplied in order to avoid a decrease in catalytic performance resulting from the precipitation of carbon as well as the carburizing metal dust in a waste heat recovery boiler installed downstream of the reactor, which result in a low energy efficiency and high investment cost. While a hydrogen to carbon monoxide ratio of 3 has been achieved for the synthesis gas produced by steam reforming, it would be necessary to add a large quantity of $CO_2$ to the feedstock gas or partially separate hydrogen from the synthesis gas, in order to provide the synthesis gas that is suited for the production of liquid fuel, namely one that has the above-mentioned ratio of 2 or 1.

In order to overcome the drawbacks described above, especially the necessity to supply heat from the outside, there has been a progress in the development of internally heated reforming reactor technology that introduces pure oxygen directly into the gas flow which includes methane. According to this technology, the heat required for the reforming reaction is supplied from the combustion of the feedstock gas that takes place inside of the reactor, and is based on partial oxidation of methane that is represented by the following formula (standard enthalpy of formation is 298K).

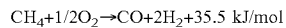
$$CH_4 + 1/2 O_2 \rightarrow CO + 2H_2 + 35.5 \text{ kJ/mol}$$

This technology can be classified by the form of reaction into gas phase partial oxidation, fixed bed autothermal reforming, fluidized bed autothermal reforming and catalyst partial oxidation. Except for the catalyst partial oxidation that is said to have partial oxidation reaction proceed in a single stage, these processes include the methane combustion reaction and the reforming reaction of $CO_2$, $H_2O$ that are generated by the combustion with methane. That is, the following exothermic reaction and endothermic reactions proceed in combination.

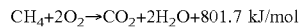
$$CH_4 + 2O_2 \rightarrow CO_2 + 2H_2O + 801.7 \text{ kJ/mol}$$

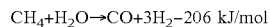
$$CH_4 + H_2O \rightarrow CO + 3H_2 - 206 \text{ kJ/mol}$$

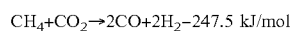
$$CH_4 + CO_2 \rightarrow 2CO + 2H_2 - 247.5 \text{ kJ/mol}$$

Among these processes, the process that is being applied to commercial plants is the gas phase partial oxidation while there has not been much progress in the commercial application of the fixed bed autothermal reforming process. The fluidized bed autothermal reforming process remains at the stage of pilot testing, while the catalytic partial oxidation remains at the basic research stage. As these technologies utilize the thermal energy supplied from the inside, energy efficiency is improved over that of the steam reforming, but it is difficult to significantly reduce the cost because it requires the supply of expensive pure oxygen produced by the cryogenic distillation air separator.

Current technologies to produce oxygen, represented by the cryogenic distillation, are capital intensive and energy intensive, and have low prospect of significant cost reduction because they are intrinsically based on the difference in the boiling point of oxygen and nitrogen that have very low boiling points, in spite of some advancements that have been made so far including the improvement in the process configuration. With this background, a novel technology for producing oxygen that has been vigorously researched in Western countries in recent years is the high temperature (up to 850° C.) oxygen separation technology that uses a dense mixed conductivity ceramic membrane. This technology is regarded as very promising because it employs a compact facility and offers the possibility of reducing energy consumption. In a mixed conductivity ceramic membrane, oxygen molecules included in air are selectively ionized on the surface of the membrane and pass through the crystal lattice, being driven by the difference in partial pressure of oxygen on both sides of the membrane. At the same time, electrons move in a direction opposite to the flow of oxygen ions so as to maintain the electrical neutrality Partial pressure of oxygen on the methane side can be minimized by placing a catalyst on the side opposite to the air side so as to oxidize methane and other substances (consume oxygen), thereby maximizing the difference in partial pressure of oxygen, namely the driving force for the selective permeation of oxygen. As the ceramic material exhibits mixed conductivity at a high temperature from 800 to 900° C., partial oxidation reaction of methane and other substances can be carried out simultaneously with the separation of air, namely in a single unit, thus providing the possibility that the reactor could become more compact and low-cost. For these reasons, basic research on the use of the ceramic membrane has been conducted by many researchers, such as the methane oxidation coupling and production of synthesis gas from methane. Particularly intensive efforts have been poured, worldwide, into the production of synthesis gas from methane including a big research project with a fund granted by the U.S. Energy Department, since there are possibilities of drastic cost reduction and reducing energy consumption.

As the basic technologies upon which the synthesis gas producing technologies that employ a ceramic membrane reactor to produce synthesis gas from a methane-containing gas have been developed, materials for the mixed conductivity ceramic membrane, configuration of the membrane including thin membrane, methane reforming catalyst and the arrangement thereof, configuration of the reactor including the sealing method, reaction heat supplying method and the entire process including the membrane reactor have been disclosed.

For the properties of the mixed conductivity ceramic membrane material, material stability as well as high oxygen permeability, particularly stability of the crystal structure in the reducing atmosphere are of great importance. When a change in the crystal structure and/or the phase change occurs, the membrane often swells and this eventually results in the destruction of the ceramic membrane. Progress has already been made, world-wide, for the development of ceramic membrane materials that have high oxygen permeability and high material stability in the reducing atmosphere, such as $Sr_{1.7}La_{0.3}Ga_{0.6}Fe_{1.4}O_{5.15}$ (WO99/21649) that has very high level of oxygen permeability and material stability in the reducing atmosphere.

As for the configuration of the membrane, it must be thin in order to increase the oxygen permeability against the bulk diffusion resistance of oxygen in the ceramic membrane, and such proposals have been made as a method for producing an inorganic thin film by means of organometallic chemical deposition on a porous supporting structure (Japanese Unexamined Patent Publication (Kokai) No. 6-135703). Also in case the surface exchange such as selective dissociation of oxygen reaches the rate-determining step of the oxygen permeation rate as the membrane is made thinner, it may be required to add a porous layer that increases the surface area or add an oxygen dissociating catalyst (WO98/41394, etc.).

As for the overall process that contains the membrane reactor for producing the synthesis gas from a gas including methane, proposals have been made on such aspects as the form of a process with various unit operations specified, and process running conditions that take the composition of feed gas into consideration (EP-0882670A1, EP-0926097A1).

For the reactor used for producing the synthesis gas from a gas that contains methane using a ceramic membrane, proposals have been disclosed as concepts of the reactor including the materials (U.S. Pat. No. 5,306,411, WO98/48921, WO99/21640, WO99/21649, EP-0962422A1, EP-0962423A1, U.S. Pat. No. 6,033,632), a method for supplying thermal energy for the reforming of hydrocarbon (WO98/48921), methods for controlling the reaction temperature for partial oxidation of hydrocarbon that is an exothermal reaction (Japanese Unexamined Patent Publication (Kokai) No. 11-70314, U.S. Pat. No. 6,010,614) and a method for sealing the joint between the ceramic membrane and metal (U.S. Pat. No. 5,725,218).

In a membrane reactor wherein synthesis gas is produced, oxygen flows along the flow of gas that contains methane thereby to join there with and, therefore methane concentration tends to be high especially in the upstream thus making carbon precipitation more likely to occur. This takes place in a reaction represented by the following formula.

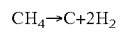

$$CH_4 \rightarrow C + 2H_2$$

Since the process of producing clean liquid fuel such as Fischer-Tropsch synthesis oil, methanol or dimethyl ether requires the operating pressure of 30 atm or higher, and pressure of the gas including natural gas such as methane must be as high as 50 atm or higher, the operating pressure of the synthesis gas production process is required to be at least 20 atm or higher, that means far higher probability of carbon precipitation than in the case of normal pressure. While the invention of WO99/21649 discloses two-dimensional and three-dimensional arrangements of various methane reforming catalysts, it does not disclose any specific means of suppressing the precipitation of carbon under normal to high pressures. While the invention of EP-0999180A2 discloses a method for suppressing carbon precipitation by recycling the product from the membrane reactor, consisting mainly of hydrogen, to the feed side, it has a drawback of complex process. Meanwhile, it is known that a methane partial oxidation catalyst such as those based on Ni loses the methane reforming capability due to oxidation. As oxygen comes out of the membrane in the membrane reactor, the methane reforming catalyst located near the surface of the membrane tends to be deactivated by oxidation. On the other hand, an increase in partial pressure of oxygen, on the gas side where methane is included that is generated due to decelerated progress of the methane reforming reaction, leads to a significant decrease in the amount of oxygen permeable through the ceramic membrane. In order to put the membrane reactor in commercial applications for producing synthesis gas, it is necessary to provide specific means for solving these problems without compromising the most remarkable feature of the reactor, namely the reactor and related facility can be made compact. However, no basic technologies related to the reaction have been disclosed as to the methane partial oxidation catalyst and the arrangement thereof that would enable practical application, in spite of various technologies related to the reactor that have been proposed so far.

The present invention relates to an oxygen permeation membrane reactor for producing synthesis gas using a gas that contains methane and air as the feedstock, and provides a method for producing synthesis gas with high efficiency, stability and low cost in a range from normal pressure to high pressure around 20 atm, while overcoming such drawbacks as carbon precipitation on the catalyst and deactivation of catalyst due to oxidation of a metal catalyst, and also providing solutions to problems caused by these drawbacks such as a decrease in oxygen supply from the ceramic membrane and the consumption of catalyst.

DISCLOSURE OF THE INVENTION

The problems described above can be solved by disposing a methane partial oxidation catalyst based on Ni or on noble metal such as Ru that has a low tendency of carbon precipitation in such an amount that deactivation due to oxidation does not occur, in a two-dimensional arrangement in the vicinity of the surface of the ceramic membrane where oxygen comes out thereof in the upstream of the methane-containing gas flow in the oxygen permeation membrane reactor, and disposing the methane partial oxidation catalyst based on Ni or on noble metal such as Ru that has a low tendency of carbon precipitation, in a three-dimensional arrangement with respect to the ceramic membrane in the downstream of the methane-containing gas flow in the reactor, and supplying steam to the methane-containing gas, that is fed to the reactor, in a ratio from 0.25 to 0.5 of steam to the carbon content in the gas. The membrane reactor may have either tubular or planar configuration, and the feedstock gas may flow in countercurrent, direct flow or flow in perpendicular direction to the air. In the case of tubular configuration, the feedstock gas may flow either inside or outside of the tube.

BEST MODE FOR CARRYING OUT THE INVENTION

Figure 1:
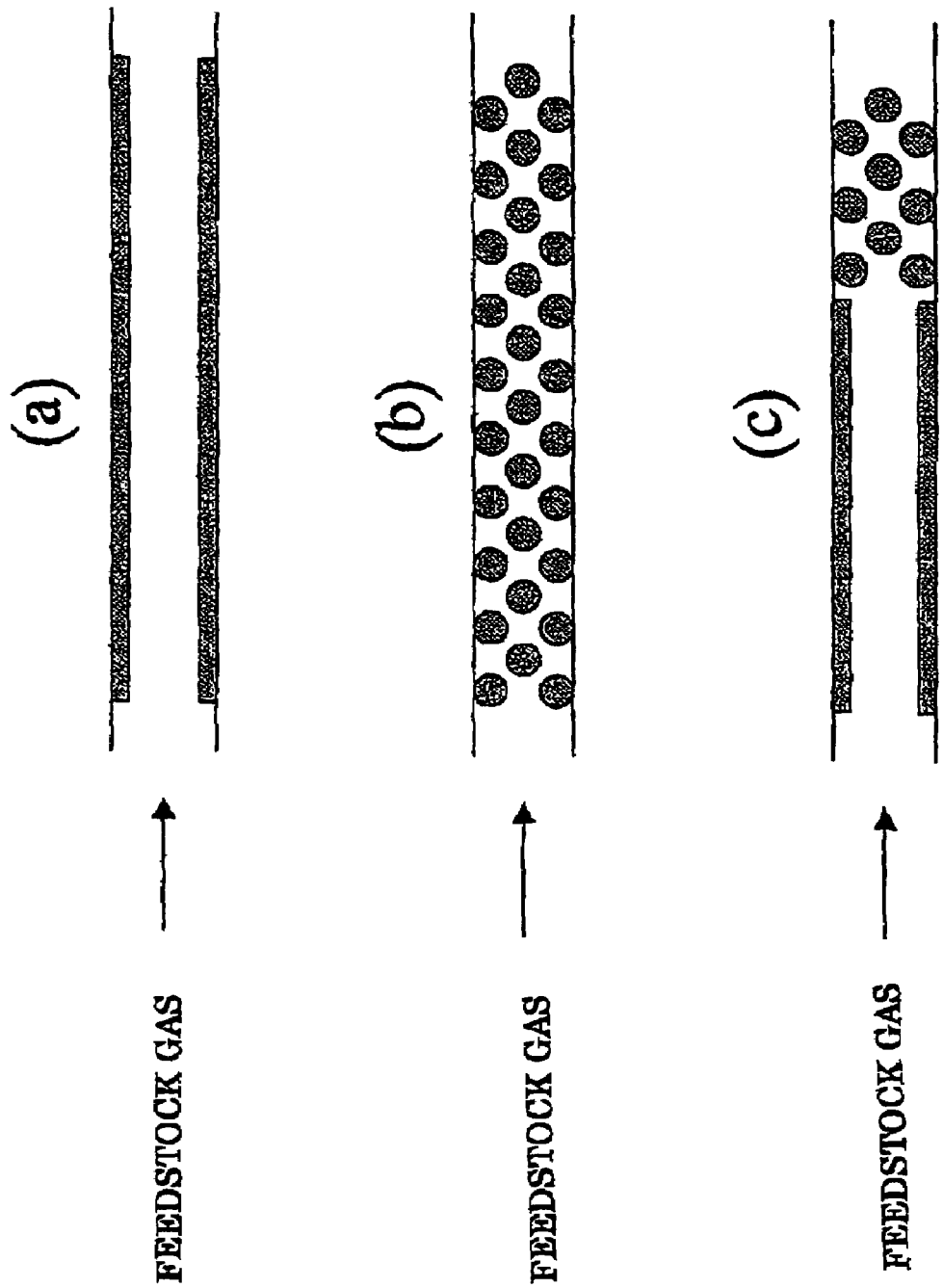
FIG. 1 schematically shows the arrangement of catalyst with respect to the membrane of the membrane reactor:
(a) for a case of two-dimensional contact arrangement;
(b) for a case, of three-dimensional contact arrangement; and
(c) an example of two-dimensional contact arrangement in the upstream of feedstock gas flow, and three-dimensional contact arrangement in the downstream according to the present invention.
Figure 2:
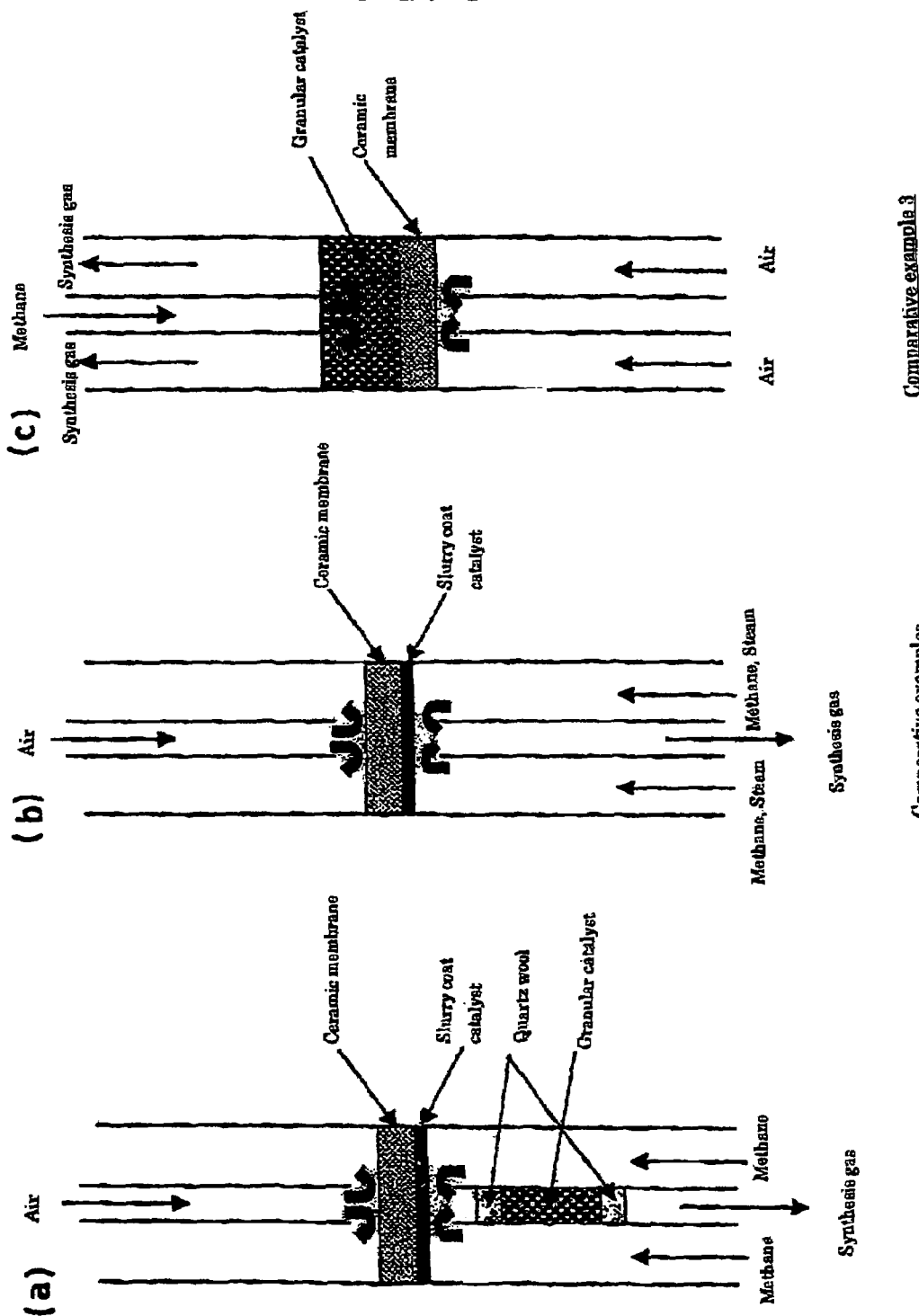
FIG. 2 schematically shows setups for experimenting with the oxygen permeation and partial oxidation of methane process using a dense, oxygen selective permeation ceramic membrane:
(a) Example 1;
(b) Comparative Examples 1, 2, 4, and 5; and
(c) Comparative Example 3.

In the production of synthesis gas in a membrane reactor using a dense, oxygen selective permeation ceramic membrane, even when assuming the use of a carbon dioxide reforming catalyst (Japanese Unexamined Patent Publication (Kokai) No. 2000-469) that is less likely to be accompanied by carbon precipitation, three-dimensional contact arrangement of the methane partial oxidation catalyst with respect to the ceramic membrane that is usually assumed that (refer to FIG. 1(b)), for example, the tubular ceramic membrane filled with the catalyst, is prone to significant precipitation of carbon on the catalyst, that becomes more damaging as the operating pressure becomes higher, in the upstream of the gas flow that contains methane, as the methane concentration is higher in the upstream. This is because the partial oxidation of methane has an extremely small influence, namely the concentration of hydrogen and other reaction product is very low and methane concentration is high in a portion that is distant from the ceramic membrane surface in the upstream portion of the gas flow, for example in a portion located near the center of the ceramic membrane reactor of tubular configuration filled with catalyst, because oxygen flows along the flow of the gas that contains methane thereby to join therewith in the membrane reactor. As a consequence, the three-dimensional contact arrangement of the methane partial oxidation catalyst in the upstream of the gas flow that contains methane in the membrane reactor provides a sufficient active surface area for the progress of partial oxidation reaction of methane, although it cannot be tolerated from the view point of carbon precipitation. While such a method as the methane partial oxidation catalyst is not placed on the surface of the ceramic membrane maybe conceived in order to suppress the precipitation of carbon, a significant decrease in the oxygen permeability is caused because only complete combustion of methane takes place on the surface of the membrane, thus resulting in a higher partial pressure of oxygen compared to a case accompanied by partial oxidation of methane.

According to the present invention, by disposing the methane partial oxidation catalyst in two-dimensional arrangement (Refer to FIG. 1(a)) in the vicinity of the ceramic membrane surface where oxygen comes therefrom in the upstream of the gas flow that contains methane in the membrane reactor, clogging of the reactor tube due to precipitation of carbon is prevented, precipitation of carbon is significantly mitigated, oxygen permeability through the ceramic membrane is maximized and catalyst consumption is minimized.

In the case of two-dimensional arrangement of the methane partial oxidation catalyst, oxygen permeability through the ceramic membrane depends mainly on the surface area of the active metal that is in reducing state. That is, high oxygen permeability is obtained if the active metal, that is in reducing state, has a sufficient surface area, or oxygen permeability is low otherwise. This is because the partial pressure of oxygen varies considerably depending on whether water and carbon dioxide, generated by complete combustion of methane or hydrogen existing in the vicinity of the surface of the ceramic membrane, are in such a state as can be readily consumed in the methane reforming reaction. When the surface area of the active metal that is in reducing state is not sufficiently large, partial pressure of oxygen becomes high and results in lower oxygen permeability through the ceramic membrane. As a result, in case the amount of methane partial oxidation catalyst is not enough for oxygen permeability through the ceramic membrane, oxygen permeability through the ceramic membrane and selectivity factor of carbon monoxide (ratio of the number of moles of carbon monoxide to the total number of moles of carbon monoxide and carbon dioxide included in the reaction product) are subjected to periodical fluctuation. Specifically, when the partial pressure of oxygen decreases on the methane-containing gas flow side of the ceramic membrane as the partial oxidation reaction of methane proceeds on the catalyst that is disposed in two-dimensional arrangement over the ceramic membrane, oxygen permeability increases. When the balance between the oxygen permeability and the reaction of partial oxidation of methane is lost resulting in excessive amount of oxygen permeable through the membrane, however, partial pressure of oxygen increases with the result of decreasing amount of oxygen permeable through the membrane. Therefore, a significant quantity of methane partial oxidation catalyst is required in order to ensure that a constant and maximum amount of oxygen is permeated.

On the other hand, in the presence of surface area of active metal that is excessively reduced in comparison to the oxygen permeability of the ceramic membrane, namely when an excessive amount of catalyst is disposed in two-dimensional arrangement, precipitation of carbon becomes conspicuous at a position distant from the methane-rich surface of the ceramic membrane, this being a cause of decreasing the reaction activity. Thus it is necessary to optimize the type and amount of methane partial oxidation catalyst to be disposed so as to match the oxygen permeability of the ceramic membrane, in order to suppress the oxidizing deactivation of the active metal and suppress the precipitation of carbon on the catalyst in the two-dimensional arrangement of the methane partial oxidation catalyst.

The present invention uses a methane partial oxidation catalyst based on Ni or on noble metal such as Ru disposed in a two-dimensional contact arrangement on the ceramic membrane. In order to suppress the oxidizing deactivation of the active metal and the precipitation of carbon, the Ni-based methane partial oxidation catalyst is preferably made in such a composition that it has a strong interaction between Ni and the support so that fine Ni particles can be distributed and the support has high capability to supply oxygen. Specifically, a catalyst having composition represented by $Ni_x/Ca_ySr_{1-y}TiO_3$ (x=0.1 to 0.3, y=0.8 or 0.0) or $Ni_x/BaTiO_3$ (x=0.1 to 0.3) that is formed by solid phase crystallization method, or preferably one having element proportions of x=0.2 and y=0.8 with ruthenium, platinum or rhodium carried thereon in a concentration of 0.1 to 1000 ppm or preferably 1.0 to 100 ppm by weight in proportion to the catalyst. For the methane partial oxidation catalyst based on noble metal such as Ru, a catalyst having composition represented by $Ru_x/Ca_ySr_{1-y}TiO_3$, $Pt_x/Ca_ySr_{1-y}TiO_3$ or $Rh_x/Ca_ySr_{1-y}TiO_3$ (x=0.0005 to 0.005, y=0.8 or 0.0) or $Ru_x/BaTiO_3$, $Pt_x/BaTiO_3$ or $Rh_x/BaTiO_3$ (x=0.0005 to 0.005), preferably x=0.001 to 0.0025 that is formed by solid phase crystallization method is used. These catalysts are supported in two-dimensional arrangement by applying a slurry, that has been prepared from fired catalyst ground into fine powder which is mixed with an organic solvent, onto the surface of a ceramic membrane that is then fired at a high temperature around 900° C. At this time, quantity of the catalyst that is supported by baking is from 1.5 to 3.5 mg, preferably from 2.0 to 3.0 mg per unit surface area (1 cm$^2$) of the ceramic membrane and unit oxygen permeation through the membrane (1 scc/min/cm$^2$).

Since partial oxidation of methane proceeds to a significant extent in the downstream of the gas flow that contains methane in the membrane reactor, hydrogen, carbon monoxide, carbon dioxide and steam exist in the methane-containing gas, so that the condition of carbon precipitation is mitigated in comparison to that in the upstream portion. In order to have the reaction of partial oxidation of methane proceed further so as to achieve sufficient level of selectivity for the target product, it is indispensable to supply oxygen further from the ceramic membrane and provide sufficient active sites for the reaction of partial oxidation of methane to take place. In other words, it is difficult to achieve substantially complete partial oxidation of methane only by disposing the catalyst in the two-dimensional arrangement.

According to the present invention, the reaction of partial oxidation of methane is caused to proceed completely by disposing the catalyst in the two-dimensional arrangement in an upstream portion of the gas flow that contains methane in the membrane reactor while disposing the methane partial oxidation catalyst that provides sufficient active sites for reaction in three-dimensional contact arrangement on the ceramic membrane in the downstream portion (refer to FIG. 1(c)). Although the condition of carbon precipitation is mitigated in the downstream portion, when compared to the condition of conventional steam reforming operation, the condition of carbon precipitation is still harsher, particularly under high pressures. For this reason, a methane partial oxidation catalyst based on Ni or on noble metal such as Ru is used similarly to the catalyst that is disposed in the two-dimensional arrangement in the upstream portion. For the Ni-based methane partial oxidation catalyst, a catalyst having composition represented by $Ni_x/Ca_ySr_{1-y}TiO_3$ (x=0.1 to 0.3, y=0.8 or 0.0) or $Ni_x/BaTiO_3$ (x=0.1 to 0.3) that is formed by solid phase crystallization method, or preferably one having element proportions of x=0.2 and y=0.8 with ruthenium, platinum or rhodium carried thereon in a proportion of 0.1 to 1000 ppm or preferably 1.0 to 100 ppm by weight to the catalyst. For the methane partial oxidation catalyst based on noble metal such as Ru, catalyst having composition represented by $Ru_x/Ca_ySr_{1-y}TiO_3$, $Pt_x/Ca_ySr_{1-y}TiO_3$ or $Rh_x/Ca_ySr_{1-y}TiO_3$ (x=0.0005 to 0.005, y=0.8 or 0.0) or $Ru_x/BaTiO_3$, $Pt_x/BaTiO_3$ or $Rh_x/BaTiO_3$ (x=0.0005 to 0.005), preferably x=0.001 to 0.0025 that is formed by solid phase crystallization method is used. These catalysts are supported in three-dimensional arrangement by forming the fired catalyst into size and shape that are suited to the extent of the reaction to be achieved, which is then put into the membrane reactor so as to fill the space of gas flow downstream of the gas flow including methane flowing from upstream to downstream.

Since the partial oxidation of methane is an exothermic reaction, the temperature increases as the reaction proceeds, with the rate of rising temperature increasing as the reaction pressure becomes higher. This is because the methane reforming reaction increases the number of moles of the substances involved, and the rate of conversion is higher at a lower pressure and is lower at a higher pressure due to the principle of equilibrium. In other words, it is because the methane reforming reaction (endothermic reaction), that takes place after the complete oxidation of methane which is a highly exothermic reaction, becomes less active at higher pressures. The ceramic membrane reactor is operated to run at a high temperature of about 850° C. in order to achieve sufficient oxygen permeability through the ceramic membrane and have the partial oxidation of methane fully proceed. However, operation at a higher temperature has adverse effect on the stability of the ceramic material and the sealing material. For this reason, the temperature rise in the reactor is preferably restricted to a minimum level and it is indispensable to supply steam. However, supplying an excessive quantity of steam increases the $H_2/CO$ ratio in the reaction product to a value significantly higher than 2, and compromises the applicability of the reaction product to the liquid synthesizing process in the downstream. Also because the supply of $H_2O$ increases the partial pressure of oxygen on the methane side of the ceramic membrane, oxygen permeability decreases. According to the present invention, based on the considerations described above, the steam/carbon ratio is set in a range from 0.25 to 0.5, thereby to mitigate the conditions of carbon precipitation as well.

EXAMPLES

The present invention will now be described in more detail by way of examples.

(1) Example of Preparing Catalyst

Each of citric acid solutions was made by dissolving a metal salt of nickel(II) nitrate hexahydrate, barium carbonate and titanium tetrapropoxide separately in an aqueous solution of citric acid with ethylene glycol added thereto, and these solutions were mixed in a proportion corresponding to the proportions of the constituent elements (Ni/Ba/Ti=0.2/1.0/1.0) in the composition of the catalyst. The mixture solution was heated to 80 to 90° C. while stirring, so as to evaporate water and make a sol containing an organometallic complex salt. The sol was subjected to pyrolysis. at 200° C. and 500° C. each for five hours, followed by firing at 900° C. in air for 10 hours, there by making the catalyst having composition of $Ni_{0.2}/BaTiO_3$. $BaTiO_3$ of a perovskite structure and a trace of NiO were identified by X-ray diffraction analysis. This catalyst was immersed in aqueous solution of rhodium nitrate so as to carry 100 ppm by weight of rhodium for unit weight of catalyst, before being dried and fired at 600° C.

(2) Example 1

This Example emulates the two-dimensional arrangement and the three-dimensional arrangement of the methane partial oxidation catalyst in the ceramic membrane reactor. Specifically, a dense ceramic membrane (11 mm in effective diameter and 1.2 mm in thickness) having disk shape made of a material having composition of $Ba_{1-x}Sr_xCo_{1-x}Fe_xO_{3-d}$ that was fired at 1150° C. was used. The methane partial oxidation catalyst as described in the example of preparing catalyst that was fired at 900° C. was crushed into powder having mean particle size of 10 μm and was turned into slurry with an organic solvent. The slurry was applied to one side of the ceramic membrane and was fired at 900° C. Weight of the catalyst that was supported by baking was about 25 mg. The ceramic membrane carrying the catalyst baked thereon was set on an experiment apparatus shown in FIG. 1. A powder having composition similar to that of the catalyst that was applied by slurry coating, was formed into particles of 20/40 mesh size after being subjected to uniaxial compression under a pressure of approximately 7 ton/cm². About 300 mg of the powder was fixed in a downstream portion of a quartz tube using quartz wool. The experiment apparatus was heated from the outside in an electric furnace so that the central portion thereof was heated to 850° C., while supplying 150 scc/min of air and 30 scc/min of methane, and the results shown in Table 1 were obtained.

TABLE 1

| | Oxygen permeability (scc/min/cm²) | CH₄ conversion ratio (%) | CO selectivity (%) | H₂/CO ratio |
|---|---|---|---|---|
| Example 1 | 10.1 | 64.0 | 97.8 | 2.02 |
| Comparative Example 1 | 9.9 | 39.0 | 74.8 | 1.95 |
| Comparative Example 2 | 7.1–9.8 | 34.4–39.2 | 74.1–75.0 | 1.95 |
| Comparative Example 3 | 10.5 | 64.2 | 98.5 | 2.10 |
| Comparative Example 4 | 8.5 | 24.3 | 49.3 | 2.62 |
| Comparative Example 5 | 7.7 | 23.7 | 43.3 | 3.47 |
| Comparative Example 6 | 1.8 | 2.8 | 0.0 | — |
| Comparative Example 7 | 2.0 | — | — | — |

(3) Comparative Example 1

A ceramic membrane having a catalyst made similarly to that of Example 1 baked thereon was set in the experiment apparatus shown in FIG. 1. The experiment apparatus was heated from the outside in an electric furnace so that the central portion thereof was heated to 850° C., while supplying 150 scc/min of air and 30 scc/min of methane, and the results shown in Table 1 were obtained. (4)

Comparative Example 2

A dense ceramic membrane, the same as that of Example 1, was loaded with about 15 mg of methane partial oxidation catalyst by slurry coating by the method described in Example 1. The membrane supporting the catalyst was set in the experiment apparatus shown in FIG. 1 and was heated from the outside in an electric furnace so that the central portion thereof was heated to 850° C., while supplying 150 scc/min of air and 30 scc/min of methane, and the results shown in Table 1 were obtained.

(5) Comparative Example 3

The dense ceramic membrane described in Example 1 was loaded with about 900 mg of catalyst, that was processed for grading of particle size as described in Example 1, supported on the membrane as shown in FIG. 1. The experiment apparatus was heated from the outside in an electric furnace so that the central portion thereof was heated to 850° C., while supplying 150 scc/min of air and 30 scc/min of methane, and the results shown in Table 1 were obtained.

(6) Comparative Example 4

The dense ceramic membrane, described in Example 1, was loaded with about 25 mg of slurry coat catalyst described in Example 1 baked on the membrane was set in the experiment apparatus shown in FIG. 1 and was heated from the outside in an electric furnace so that the central portion thereof was heated to 850° C., while supplying 150 scc/min of air and 30 scc/min of methane, with 10 scc/min of steam being fed on the methane side, and the results shown in Table 1 were obtained.

(7) Comparative Example 5

An experiment was conducted under the same conditions as those of Comparative Example 4 except for feeding steam at a rate of 20 scc/min, and the results shown in Table 1 were obtained.

(7) Comparative Example 6

The dense ceramic membrane described in Example 1 was set in an experiment apparatus similarly to Comparative Examples 1, 2, 4 and 5, without loading the methane partial oxidation catalyst. The experiment apparatus was heated from the outside in an electric furnace so that the central portion thereof was heated to 850° C., while supplying 150 scc/min of air to one side of the ceramic membrane and 30 scc/min of methane to the other side, and the results shown in Table 1 were obtained.

(8) Comparative Example 7

The dense ceramic membrane described in Example 1 was set in an experiment apparatus similarly to Comparative Examples 1, 2, 4 and 5, without loading the methane partial oxidation catalyst. The experiment apparatus was heated from the outside in an electric furnace so that the central portion thereof was heated to 850° C., while supplying 150 scc/min of air to one side of the ceramic membrane and 30 scc/min of helium to the other side, and the results shown in Table 1 were obtained.

INDUSTRIAL APPLICABILITY

The present invention specifies a method for partial oxidation of methane using a dense, oxygen selective permeation ceramic membrane, wherein carbon precipitation on the methane partial oxidation catalyst and deactivation of a metal catalyst due to oxidation are suppressed while maximizing the amount of oxygen permeated through the ceramic membrane and the yield of synthesis gas production and minimizing the consumption of the catalyst, in a range of feedstock gas stream pressures from normal pressure to a high pressure around 20 atm. Effects of the method were verified through experiments.

The invention claimed is:

1. A method for partial oxidation of methane using an oxygen selective permeation ceramic membrane having a first side and a second side comprising:

contacting air with the first side of said oxygen selective permeation ceramic membrane, contacting a feedstock gas having methane as its main component with the second side of said oxygen selective permeation ceramic membrane, and carrying out partial oxidation of methane with oxygen, which selectively permeates from the first side to the second side of the oxygen selective permeation ceramic membrane;

wherein a first catalyst for partial oxidation of methane is disposed two-dimensionally on the second side of said oxygen selective permeation ceramic membrane, and a second catalyst for partial oxidation of methane is disposed three-dimensionally in said feedstock gas stream downstream from said first catalyst.

2. The method for partial oxidation of methane using the oxygen selective permeation ceramic membrane according to claim 1, wherein said first catalyst for partial oxidation of methane is a supported Ni catalyst or a supported noble metal catalyst, and a slurry, which is formed by adding an organic solvent to a powder of said supported Ni catalyst or said supported noble metal catalyst, is coated on the second side of said oxygen selective permeation ceramic membrane and baked thereon.

3. The method for partial oxidation of methane using oxygen selective permeation ceramic membrane according to claim 2, wherein the Ni-based methane partial oxidation catalyst has a composition of $Ni_x/Ca_ySr_{1-y}TiO_3$ (x=0.1 to 0.3, y=0.8 or 0.0), or $Ni_x/BaTiO_3$ (x=0.1 to 0.3), or the product of supporting 0.1 to 1000 ppm by mass of Ru, Pt or Rh on $Ni_x/Ca_ySr_{1-y}TiO_3$ or $Ni_x/BaTiO_3$ based on the mass thereof, is used for said supported Ni catalyst.

4. The method for partial oxidation of methane using the oxygen selective permeation ceramic membrane according to claim 1, wherein said second catalyst for partial oxidation of methane is a supported Ni catalyst or a supported noble metal catalyst, and a sintered compact of said supported Ni catalyst or said supported noble metal catalyst or a powder of said supported Ni catalyst or said supported noble metal catalyst which is filled into a cylindrical container, is disposed in said feedstock gas stream downstream from said first catalyst.

5. The method for partial oxidation of methane according to claim 4, wherein the Ni-based methane partial oxidation catalyst has a composition of $Ni_x/Ca_ySr_{1-y}TiO_3$ (x=0.1 to 0.3, y=0.8 or 0.0), or $Ni_x/BaTiO_2$ (x=0.1 to 0.3), or the product of supporting 0.1 to 1000 ppm by mass of ruthenium, platinum or rhodium Rh on $Ni_x/Ca_ySr_{1-y}TiO_3$ or $Ni_x/BaTiO_3$ based on the mass thereof, is used for said supported Ni catalyst.

6. The method for partial oxidation of methane using the oxygen selective permeation ceramic membrane according to claim 1, wherein steam is mixed into said feedstock gas stream at a ratio from 0.25 to 0.5 moles of steam to a mole of carbon in said feedstock gas.

* * * * *